United States Patent [19]

Nakanishi et al.

[11] Patent Number: 5,082,363

[45] Date of Patent: Jan. 21, 1992

[54] OPTICAL DISTANCE MEASURING APPARATUS AND METHOD USING LIGHT PROJECTION PULSES

[75] Inventors: Hiroaki Nakanishi, Nagaokakyo; Hidehiro Fukumoto, Hirakata; Kuniharu Shibata, Takatsuki; Hidetoshi Matsumoto, Kyoto, all of Japan

[73] Assignee: Omron Tateisi Electronics Co., Kyoto, Japan

[21] Appl. No.: 625,683

[22] Filed: Dec. 12, 1990

Related U.S. Application Data

[63] Continuation of Ser. No. 307,821, Feb. 8, 1989, abandoned.

[30] Foreign Application Priority Data

Feb. 12, 1988 [JP] Japan .................. 63-31515
Feb. 15, 1988 [JP] Japan .................. 63-32182
Aug. 30, 1988 [JP] Japan .................. 63-217973

[51] Int. Cl.⁵ .......................... G01C 3/00; G01C 5/00
[52] U.S. Cl. .................................. 356/1; 250/201.6; 354/403
[58] Field of Search ............... 356/1, 4; 354/403; 250/201.6

[56] References Cited

U.S. PATENT DOCUMENTS

| | | |
|---|---|---|
| 4,429,967 | 2/1984 | Tokuda et al. |
| 4,623,237 | 11/1986 | Kaneda et al. .......... 354/403 |
| 4,642,451 | 2/1987 | Tsunekawa et al. ........ 250/201 AF |
| 4,697,904 | 10/1987 | Takahashi et al. ............ 354/403 |
| 4,723,073 | 2/1988 | Amikura et al. ............. 354/403 X |
| 4,935,613 | 6/1990 | Ishiguro et al. ............ 356/4 X |

FOREIGN PATENT DOCUMENTS 0140650 5/1985 European Pat. Off. .
57-44809 3/1982 Japan .

OTHER PUBLICATIONS

Patent Abstracts of Japan, vol. 9, No. 329 (P-416) [2052], Dec. 24, 1985, JP-A-60-154176.
Patent Abstracts of Japan, vol. 6, No. 116 (P-125), 29th Jun. 1982; & JP-A-57 44 809.

Primary Examiner—Stephen C. Buczinski
Attorney, Agent, or Firm—Dickstein, Shapiro & Morin

[57] ABSTRACT

In a distance measuring apparatus for optically detecting a distance to an object by using a triangulation method, two signals which are obtained from a position sensitive device are added and it is detected that the result of the addition has exceeded a predetermined threshold level. On the other hand, it is assumed that a signal waveform to drive a light emitting device is a signal whose level increases with an elapse of time. When the addition result exceeds the threshold level, the level of the drive signal is held constant. At this time, by dividing a signal obtained from the position sensitive device by the signal indicative of the addition result, a signal relating to the distance to the object is obtained.

14 Claims, 16 Drawing Sheets

Fig.2
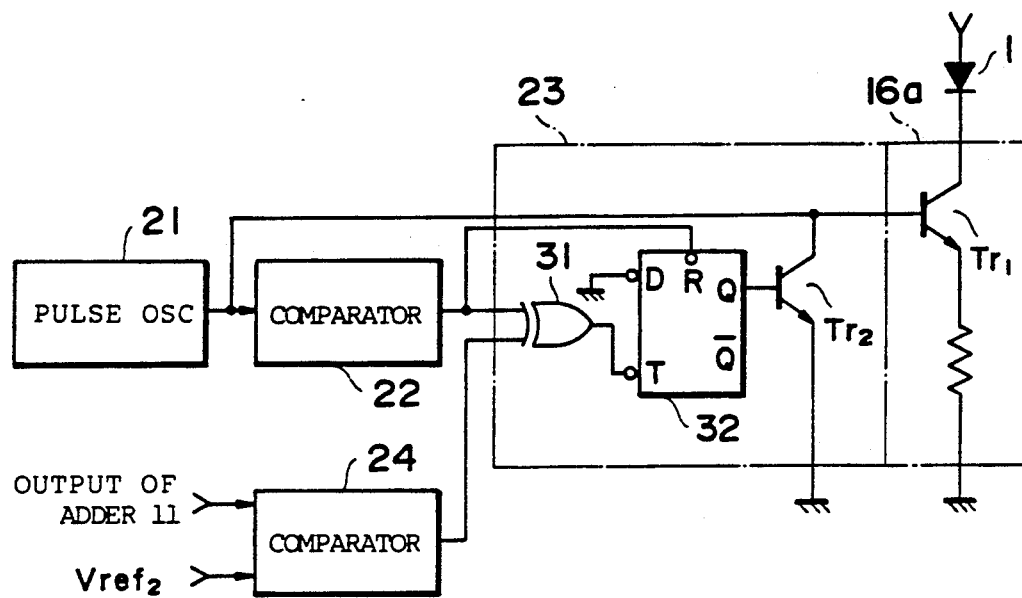
Fig.4a OUTPUT OF ADDER 11
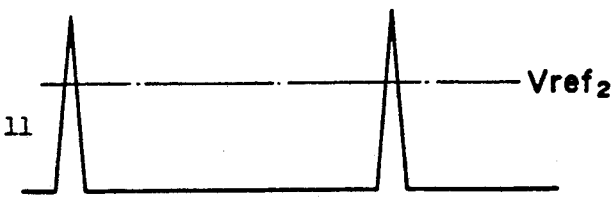
Fig.4b LIGHT PROJECTION PULSE SIGNAL

Fig.3a  OUTPUT OF PULSE OSC 21 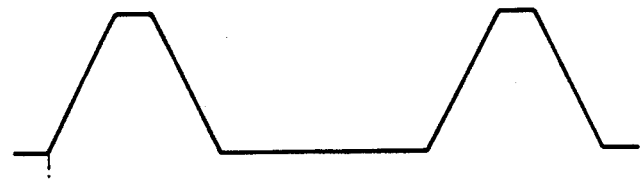
Fig.3b  OUTPUT OF COMPARATOR 22 
Fig.3c  OUTPUT OF EOR CIRCUIT 31 
Fig.3d  Q OUTPUT OF FLIP-FLOP 32 
Fig.3e  DRIVE SIGNAL OF LIGHT PROJECTING DEVICE 
Fig.3f  OUTPUT OF ADDER 11 
Fig.3g  OUTPUT OF COMPARATOR 24 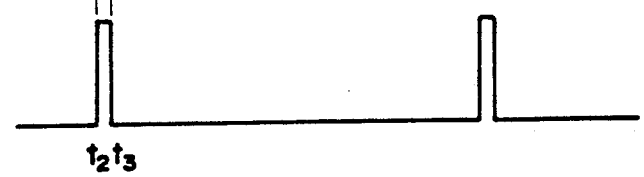

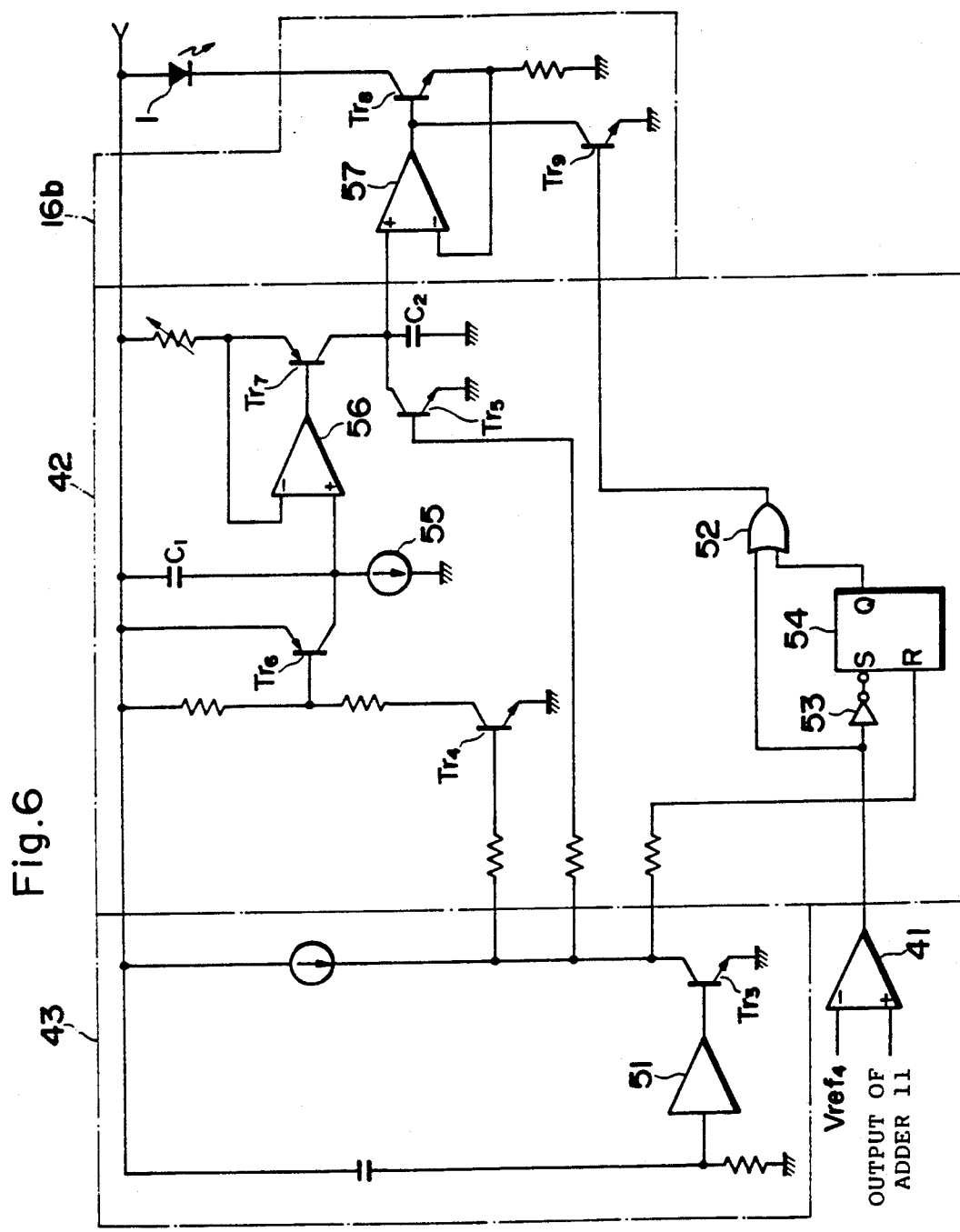

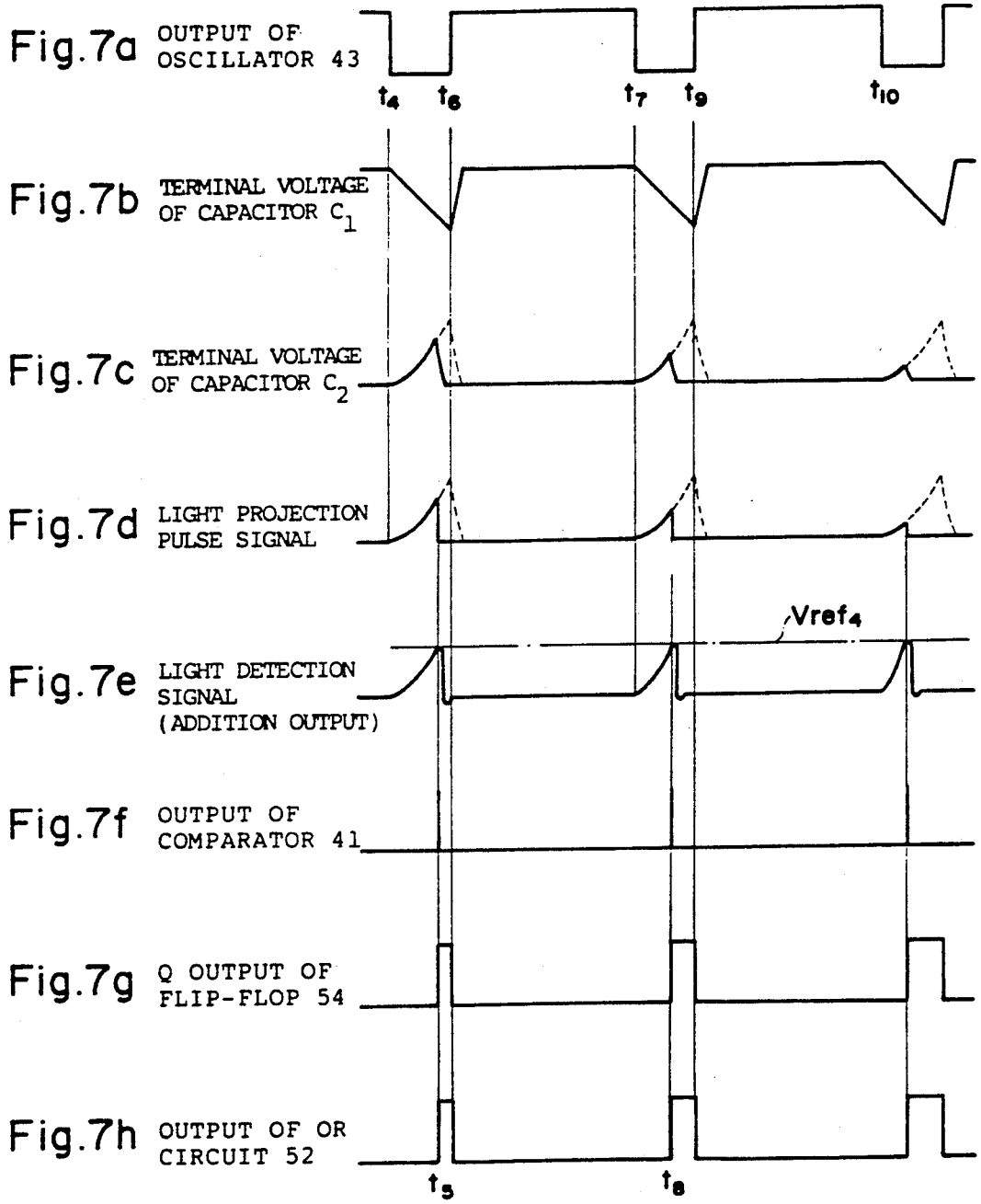

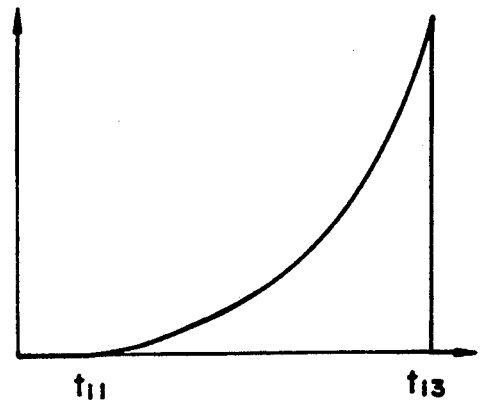
Fig.8a LIGHT PROJECTION PULSE SIGNAL
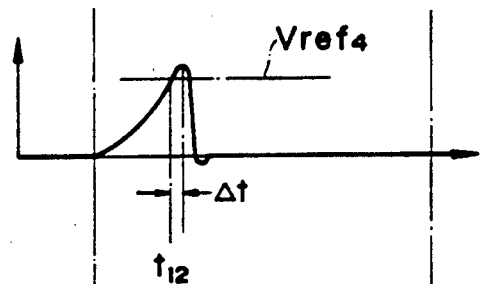
Fig.8b LIGHT DETECTION SIGNAL
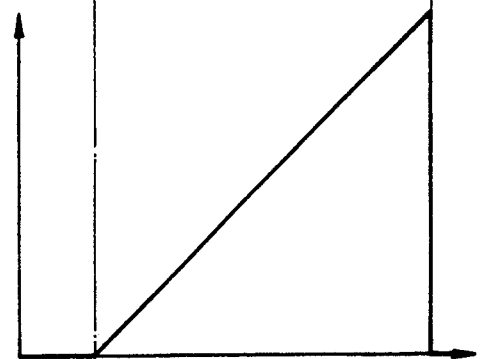
Fig.8c LIGHT PROJECTION PULSE SIGNAL
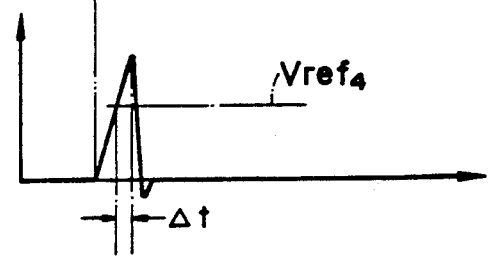
Fig.8d LIGHT DETECTION SIGNAL Fig.10a OUTPUT OF OSCILLATOR 43 
Fig.10b OUTPUT OF OPERATIONAL AMPLIFIER 61 
Fig.10c ANODE VOLTAGE OF LIGHT EMITTING DIODE 1 
Fig.10d LIGHT PROJECTION PULSE SIGNAL 
Fig.10e LIGHT DETECTION SIGNAL (ADDITION OUTPUT) 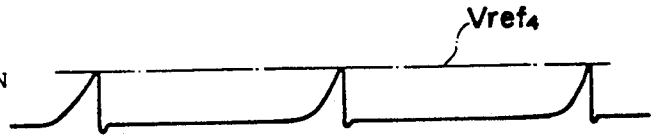
Fig.10f OUTPUT OF COMPARATOR 11 
Fig.10g Q OUTPUT OF FLIP-FLOP 54 
Fig.10h OUTPUT OF OR CIRCUIT 52 

Fig.15a OUTPUT OF OSCILLATOR 43 
Fig.15b OUTPUT OF OPERATIONAL AMPLIFIER 61 
Fig.15c COLLECTOR VOLTAGE OF TRANSISTOR $Tr_{12}$ 
Fig.15d OUTPUT OF I/V CONVERTER 8 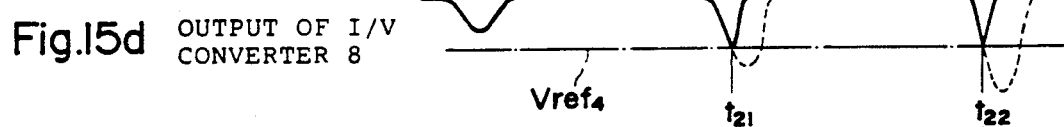
$Vref_4$  $t_{21}$  $t_{22}$
Fig.15e OUTPUT OF COMPARATOR 41 
Fig.15f OUTPUT OF OR CIRCUIT 52 

OPTICAL DISTANCE MEASURING APPARATUS AND METHOD USING LIGHT PROJECTION PULSES

This application is a continuation of application Ser. No. 07/307,821, filed Feb. 8, 1989, now abandoned.

BACKGROUND OF THE INVENTION

1. Field of the Invention

The present invention relates to a distance measuring apparatus for optically accurately measuring the distance to an object to be detected by a triangulation method and, more particularly, to a distance measuring apparatus in which a light amount of the reflected light is held to a predetermined level.

2. Prior Art Statement

Hitherto, for instance, as shown in JP-A-57-44809, a distance measuring apparatus with use of the triangulation method as shown in FIG. 17 has been known as an apparatus to detect the distance to an object. According to such an apparatus, a light emitted from a light projecting device 1 such as a light emitting diode or the like is converted into a parallel light beam 3 by using a collimating lens 2. The light beam 3 is projected in the direction to detect a distance. A condenser lens 5 is provided to detect the reflected light from an object 4 existing at a position which is away from the lens 2 by a certain distance. A position sensitive device (hereinafter, abbreviated to a PSD) 6 to output currents from both ends on the basis of the light detecting positions is arranged behind the condenser lens 5. When the object 4 interrupts the light beam 3 at a position within a predetermined distance range from the front surface of the lens 2, the diffused reflected light from the object 4 are converged by the condenser lens 5 and impinged upon the PSD 6. Therefore, the position of the reflected light which is impinged upon the PSD 6 changes depending on the distance from the lens 2 to the object 4 to be detected. A power source 7 to bias is connected to the PSD 6 and two analog current outputs corresponding to the light impinging positions are generated from both ends of the PSD 6. The output signals are input to I/V (current to voltage) converters 8 and 9, respectively. The I/V converters 8 and 9 convert the current outputs from the PSD 6 into the voltage signals and supply them to a subtracting circuit 10 and an adding circuit 11. A dividing circuit 12 divides an output of the subtracting circuit 10 by an output of the adding circuit 11, thereby outputting the normalized signal corresponding to the light detecting position irrespective of the sum of the light detection amounts. The output signal is input to, e.g., a comparing circuit 13. The comparing circuit 13 detects a signal exceeding a predetermined threshold level and gives a detection signal to a signal processing circuit 14. The light projecting device 1 is lit on through a light projecting device drive circuit 16 by a pulse output of a pulse oscillator 15. The output of the pulse oscillator 15 is also given to the signal processing circuit 14. When a detection signal is input for a pulse oscillating period, the signal processing circuit 14 outputs the detection signal to the outside through an output circuit 17.

According to such a conventional distance measuring apparatus, the position detection signal is obtained by dividing the output of the subtracting circuit by the output of the adding circuit by the dividing circuit. Therefore, there is a drawback such that its error amount largely changes in dependence on the light amount level. That is, although the accurate position detection signal is derived if the light amount level is sufficiently large, if the amount of light which impinges upon the PSD 6 is small, the position detection signal largely changes due to a slight fluctuation of the output difference of the I/V converters 8 and 9. Therefore, there is a drawback such that the measuring accuracy varies by the light amount. If the gains of the I/V converters 8 and 9 to convert the light detection current signals into the voltage signals are raised to increase the input level of the dividing circuit, when an object exists at a close position and the light sensitive level rises, the input level is saturated and the accurate division output cannot be derived. Therefore, there is a problem such that the fluctuation of the input level of the dividing circuit is large and errors easily occur.

On the other hand, since the fluctuation of the input level of the dividing circuit is large, there is a problem such that errors easily occur unless the dividing circuit of a wide dynamic range and a high response speed is used.

Further, in the case of constructing the dividing circuit by using a log amplifier, both inputs are limited to the inputs having the same sign. Therefore, an object can be detected only in the half region of the PSD 6 such that the difference between the outputs of the I/V converters 8 and 9 is always positive. There is a drawback such that the use efficiency of the PSD 6 is low and its resolution deteriorates.

SUMMARY OF THE INVENTION

It is an object of the present invention that the position of an object can be accurately detected while keeping the light detection amount of the position sensitive device to a predetermined level and that even when the reflected light amount from the object is large, the light detection amount can be certainly held to a predetermined level.

Another object of the invention is that by keeping the light detection amount of the position sensitive device to a predetermined level, the position of an object can be accurately detected without requiring the high response speed to a dividing circuit.

Still another object of the invention is that a change in light detection amount of a position sensitive device is reduced irrespective of the surface state or position of an object and the position of an object can be accurately detected on the basis of a ratio of two output currents of the position sensitive device.

A distance measuring apparatus according to the present invention comprises: adding means for adding current outputs which are obtained from a position sensitive device to each other; comparing means for comparing an output of the adding means with a predetermined threshold value and for generating a comparison output when the output exceeds the threshold value; light projection control means for stopping the light projection by light projecting means when the comparison output is generated from the comparing means; and position signal detecting means for outputting a signal relating to the position of an object on the basis of the output currents of the position sensitive device which are obtained when the light projection is stopped.

According to the invention, the current signals obtained from the position sensitive device are added to each other by the adding means and its addition output is compared with the predetermined threshold value by the comparing means. When the addition output reaches a level exceeding the predetermined threshold value, the driving of the light projecting device is stopped. That is, the position detection signal is obtained on the basis of an output distribution of the position sensitive device when the reflected light amount from the object becomes a predetermined value, for instance, on the basis of the output difference or output ratio.

Therefore, it is not always necessary to use the dividing circuit. Even when the dividing circuit is used, a change in input signal level can be fairly reduced. Thus, the distance to the object can be always detected at a predetermined accuracy.

A distance measuring apparatus according to the present invention comprises: adding means for adding current outputs which are obtained from a position sensitive device to each other; comparing means for comparing an output of the adding means with a predetermined threshold value and for generating an output when the addition output exceeds the predetermined threshold value; light projection control means for generating, at a predetermined period, a light projection pulse whose level increases and whose increasing rate gradually increases from the light projection start point and for stopping the generation of the light projection pulse signal when the output is generated from the comparing means; and position signal detecting means for outputting a signal relating to the position of an object on the basis of the output currents of the position sensitive device which are obtained when the light projection is stopped.

According to the invention, the light projection pulse signal is the output whose level gradually increases. The reflected light amount also gradually increases and the light detection signal which increases with an elapse of time is obtained. Therefore, for an object in which the reflected light amount is large, the outputs which are obtained from the position sensitive device reach the threshold level of the comparing means in a short time. Since the light projection is stopped in a short time after the start of the light projection while the change amount is relatively small, there is hardly a time delay of the stop of the light emission. The light projection is stopped before the saturation of the dividing circuit and the position of the object is detected.

Therefore, even if a signal in which the peak value of the light projection pulse signal is large is used, the fluctuation of the light sensitive level can be suppressed to a small value and the efficiency of the light projection control means can be improved. Therefore, the input signal which is given to the dividing circuit which is used in the position signal detecting means is not saturated and one of the two inputs of the dividing circuit is held to almost a predetermined value. Thus, its error amount can be reduced and the distance to an object can be detected.

A distance measuring apparatus according to the present invention comprises: adding means for adding signals which are obtained from a position sensitive device to each other; comparing means for comparing an addition output of the adding means with a predetermined threshold level and for generating a output when the addition output exceeds the predetermined threshold level; light projection control means for generating, at a predetermined period, a light projection pulse signal whose output level gradually increases and for holding the light projection pulse signal to its level when the output is generated from the comparing means; and position signal detecting means for outputting a signal relating to the position of an object on the basis of an output signal distribution of a dividing circuit by giving the output signals which are obtained from the position sensitive device to the dividing circuit.

According to the invention having the above feature, the light projecting device is intermittently driven by the light projection pulse signal whose output level gradually increases and the parallel light beam is projected to the detecting area by the light projecting means. If the reflected light is obtained from an object in the detecting region, a light detection signal is derived at a position where the reflected light impinges upon the position sensitive device. The two output signals of the position sensitive device are added to each other by the adding means and the added value is compared with the predetermined threshold level by the comparing means. When the added value exceeds the threshold level, the level of the drive signal of the light projecting device is held to the level at that time point. The reflected light amount is kept to substantially a predetermined value and the position of the object is detected on the basis of the output distribution of the position sensitive device at that time.

Therefore, according to the invention, the sum of light detection signals of the reflected light can be held to almost a predetermined value and the position of an object can be detected by the position signal detecting means. An output of the position sensitive device is divided by the added value by the dividing circuit. Since the level of the light projection drive signal is held constant, the input of the dividing circuit is not largely fluctuated. Therefore, a wide dynamic range and a high response speed are not required to the dividing circuit. Even if the ordinary dividing circuit is used, the position detection signal can be obtained at a high accuracy.

Further, a distance measuring apparatus according to the invention comprises: comparing means for comparing either one of current outputs which are obtained from a position sensitive device with a predetermined threshold value and for generating, at a predetermined period, an output when the output exceeds the predetermined threshold value; light projection control means for generating a light projection pulse whose level increases and whose increasing rate gradually increases from the light projection start point and for stopping the generation of the light projection pulse signal when the output is generated from the comparing means; and a dividing circuit for calculating a ratio of the output currents of the position sensitive device which are obtained when the light projection is stopped.

According to the invention, the light beam is projected from the light projecting means toward a detecting region. When an object exists on the optical axis of the light beam, the reflected light from the object is detected at the corresponding position of the position sensitive device provided for the light detecting means. Current outputs of the values corresponding to the light detecting position of the light are obtained from the position sensitive device. The light projection is stopped when either one of the current outputs reaches a predetermined level. The ratio of the current outputs which are obtained at both ends of the position sensitive device at that time is calculated by the dividing circuit, thereby detecting the distance to the object.

Therefore, since one of the two inputs of the dividing circuit is set to almost a predetermined value without saturating the input signals which are given to the dividing circuit, an error amount upon division is reduced. The distance to the object can be always detected at a predetermined accuracy. The signal processing circuit can be also simplified.

A distance measuring apparatus according to the present invention comprises: adding means for adding current outputs which are obtained from a position sensitive device to each other; comparing means for comparing an addition output of the adding means with a predetermined threshold value and for generating an output when the addition output exceeds the predetermined threshold value; light projection control means for generating, at a predetermined period, a light projection pulse whose level increases and whose increasing rate gradually increases from the light projection start point and for stopping the generation of the light projection pulse signal when the output is generated from the comparing means; and a dividing circuit for outputting a signal relating to the position of an object on the basis of the ratio of addition output of the adding means and either one of the output currents of the position sensitive device.

According to the invention, the current outputs which are obtained from the position sensitive device are added to each other by the adding means and when the added value reaches a predetermined level, the light projection is stopped. The ratio of the addition output at that time and either one of the current outputs of the position sensitive device is calculated by the dividing circuit, thereby detecting the distance to the object.

According to the invention, the light projection is stopped when the addition output reaches the predetermined level, and the distance to the object is detected on the basis of the ratio of the addition output and either one of the current outputs, so that the dividing circuit is not saturated. On the other hand, since one of the two inputs of the dividing circuit is set to almost a predetermined value, an error amount upon division is reduced and the distance to the object can be always detected at a predetermined accuracy.

BRIEF DESCRIPTION OF THE DRAWINGS

FIG. 2 is a circuit diagram showing a detailed construction of a light projection control circuit and its peripheral circuits in the first embodiment;

FIGS. 3a to 3g are waveform diagrams showing a waveform in each section in the embodiment;

FIGS. 4a and 4b are waveform diagrams showing another example of the signal waveforms;

FIG. 6 is a circuit diagram showing a detailed construction of a light projection control circuit and its peripheral circuits in the second embodiment;

FIGS. 7a to 7h are waveform diagrams showing a waveform in each section in the second embodiment;

FIGS. 8a to 8d are waveform diagrams showing the relation between the light projection pulse and the light detection signal;

FIGS. 10a to 10h are waveform diagrams showing a waveform in each section in the third embodiment;

FIGS. 15a to 15f are waveform diagrams showing a waveform in each section in the fifth embodiment;

DETAILED DESCRIPTION OF PREFERRED EMBODIMENTS

First Embodiment

Figure 1:
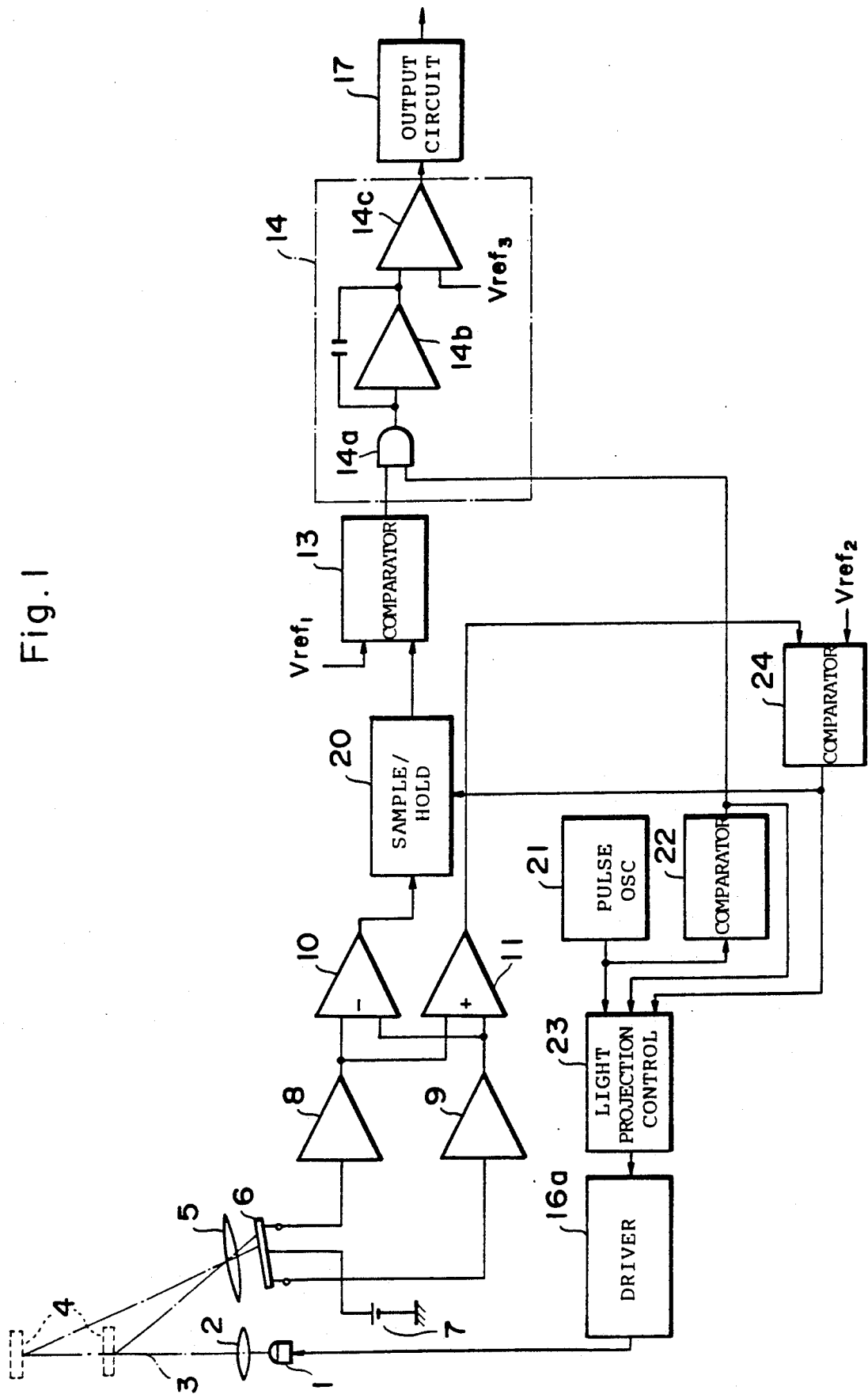
FIG. 1 is a block diagram showing a construction of a distance measuring apparatus according to the first embodiment of the present invention.
Figure 17:
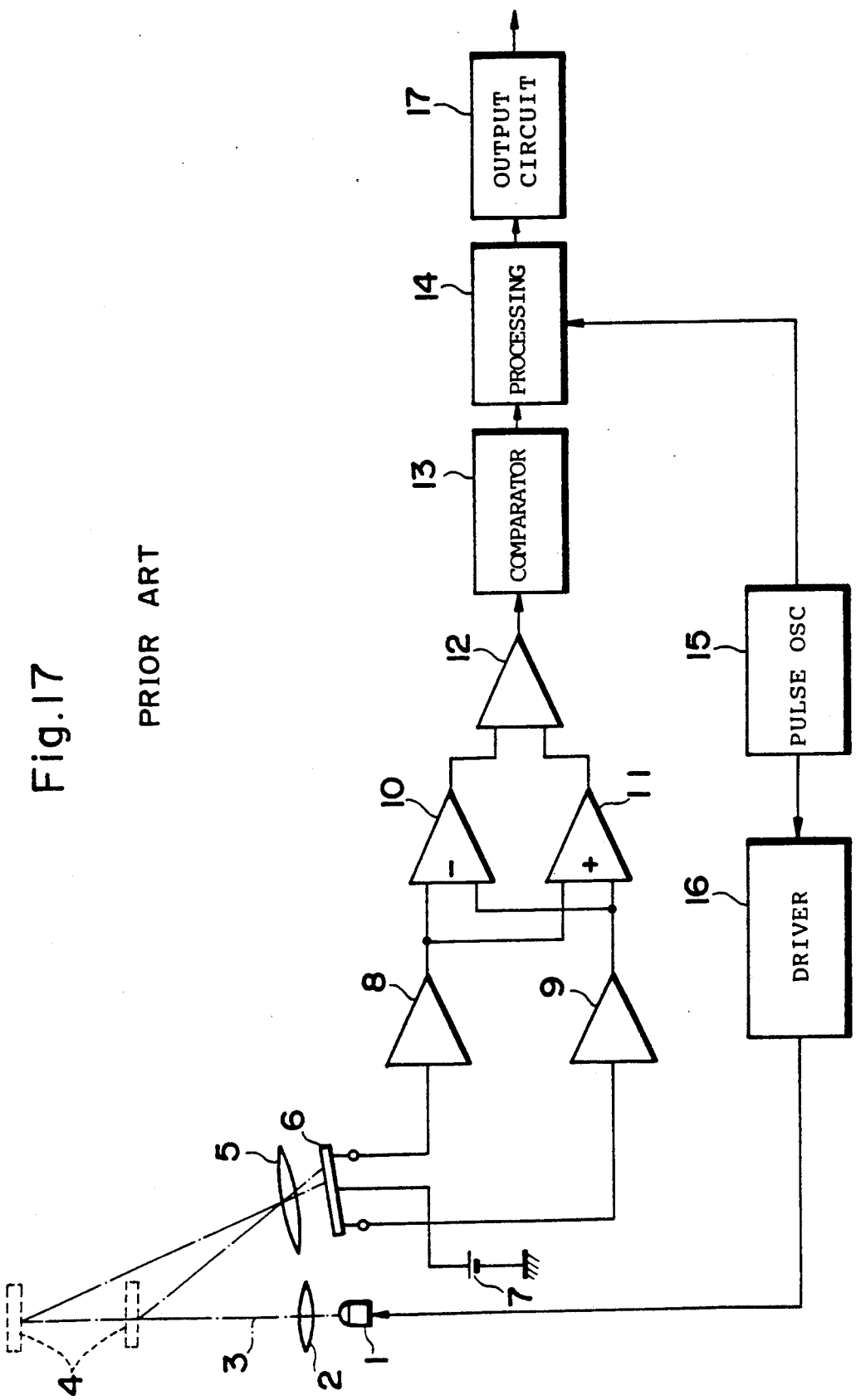
FIG. 17 is a block diagram showing an example of a conventional distance measuring apparatus.

FIG. 1 is a block diagram showing a construction of the first embodiment of a distance measuring apparatus according to the present invention. In FIG. 1, the same parts and components as those in the conventional apparatus shown in FIG. 17 are designated by the same reference numerals. In the first embodiment, the light emitted from the light projecting device 1 is also converted into the parallel light beam 3 by using the collimating lens 2. The light beam 3 is projected in the direction to detect a distance to an object to be detected. The condenser lens 5 to detect the reflected light from the object is arranged at a position which is away from the collimating lens 2 by a predetermined distance. The one-dimensional position sensitive device 6 is arranged behind the condenser lens 5. The power source 7 to bias is connected to a common electrode of the position sensitive device (PSD) 6. Two analog currents are output from terminals at both ends of the PSD 6 in correspondence to the positions upon which light impinges the device. The current outputs of the PSD 6 are given to the I/V converters 8 and 9, respectively. The I/V converters 8 and 9 convert the current outputs derived from both ends of the PSD 6 into the voltage signals and give them to the subtracting circuit 10 and adding circuit 11, respectively. The output of the subtracting circuit 10 is input to the comparing circuit 13 through a sample and hold (S/H) circuit 20. A predetermined level $V_{ref1}$ corresponding to a distance to be detected in a distance measuring range is set in the comparing circuit 13. When a signal of a level exceeding the predetermined level $V_{ref1}$ is input, the comparing circuit 13 gives an object detection signal to the signal processing circuit 14.

The distance measuring apparatus in the embodiment has a pulse oscillator 21 to intermittently generate a trapezoidal signal. An output signal of the pulse oscillator 21 is input to a comparing circuit 22 and a light projection control circuit 23. The output of the adding circuit 11 is given to a comparing circuit 24. A predetermined threshold level $V_{ref2}$ is set to the comparing circuit 24. Only when the addition output of the adding circuit 11 exceeds the predetermined level $V_{ref2}$, the comparing circuit 24 outputs a control signal to the light projection control circuit 23. The light projection control circuit 23 constructs light projection control means for directly transferring the output of the pulse oscillator 21 to a light projection device drive circuit 16a until the signal is input from the comparing circuit 24. The drive circuit 16a intermittently drives the light projecting device 1. The drive circuit 16a, light projecting device 1, and collimating lens 2 construct a light projecting section to project the parallel light beam toward a detecting region. The comparing circuit 22 converts the trapezoidal output signal of the oscillator 21 into the square wave signal and its output is input to the signal processing circuit 14 and light projection control circuit 23. The signal processing circuit 14 has: a gate circuit 14a for allowing the output of the comparing circuit 13 to pass by using the square wave output of the comparing circuit 22 as a gate control signal; an integrating circuit 14b to integrate an output of the gate circuit 14a by a predetermined time constant; and a comparing circuit 14c to discriminate an output of the integrating circuit 14b by a predetermined threshold level $V_{ref3}$. When the detection signal is continuously obtained from the comparing circuit 13 a plurality of times, the signal processing circuit 14 gives an object detection signal to the output circuit 17. The output circuit 17 outputs the detection signal to the outside as an output signal such as a relay contact output, an open collector output, or the like.

The light projection control circuit 23 will now be further described in detail. FIG. 2 is a circuit diagram showing a detailed construction of the light projection control circuit 23 and its peripheral circuits. In the diagram, the output of the pulse oscillator 21 is input to the comparing circuit 22 and a base of a transistor $Tr_1$. The comparing circuit 22 converts the trapezoidal signal of the pulse oscillator 21 into the square wave and gives its output to one input terminal of an exclusive OR circuit (hereinafter, referred to as an EOR circuit) 31. An output of the comparing circuit 24 to compare the output of the adding circuit 11 with the predetermined threshold value $V_{ref2}$ is input to the other input terminal of the EOR circuit 31. The EOR circuit 31 gives an exclusive OR signal to a timing input terminal T of a DT flip-flop 32. The inverted signal of the L level, that is, the signal of the H level is given to a data input terminal D of the DT flip-flop 32. On the other hand, the DT flip-flop 32 is forcedly reset by a trailing edge of the output signal of the comparing circuit 22. The DT flip-flop 32 gives its Q output to a base of a transistor $Tr_2$. The transistor $Tr_2$ is connected between a base and an emitter of the transistor $Tr_1$. When the transistor $Tr_2$ is turned on, the transistor $Tr_1$ is forcedly turned off. A light source is connected to the collector terminal of the transistor $Tr_1$ through the light projecting device 1, for instance, a light emitting diode. The transistor $Tr_1$ operates as the light projecting device drive circuit 16a to intermittently drive the light projecting device 1.

The operation of the embodiment will now be described with reference to time charts of FIGS. 3a to 3g. FIG. 3a shows the oscillation signal of the pulse oscillator 21 and the oscillation signal is converted into the square wave signal as shown in FIG. 3b by the comparing circuit 22. The square wave signal is then input as a digital signal to the signal processing circuit 14 (see FIG. 1) as well as the EOR circuit 31 of the projection control circuit 23 (see FIG. 2). Therefore, as shown in FIG. 3c, the EOR circuit 31 outputs a signal as shown in the diagram from time $t_1$. At time $t_1$, the Q output of the DT flip-flop 32 is at the L level as shown in FIG. 3d and the transistor $Tr_2$ is turned off. Thus, when the output of the pulse oscillator 21 is given to the transistor $Tr_1$, a drive current flows through the light projecting device 1 as shown in FIG. 3e. When the object 4 exists in a predetermined detecting range on the optical path of the light beam 3, the diffused reflected lights from the object 4 are transmitted through the condenser lens 5 to the PSD 6. The currents obtained at both ends of the PSD 6 are converted into the voltage signals by the I/V converters 8 and 9. The voltage signals are added by the adding circuit 11, so that a signal as shown in FIG. 3f is derived from the adding circuit 11. A gradient of the addition signal differs in accordance with the distance to the object 4 to be detected or its surface state, for instance, color, glossiness, or the like.

At time $t_2$ when the level of the addition signal exceeds the preset threshold value $V_{ref2}$ in the comparing circuit 24, an output as shown in FIG. 3g is obtained from the comparing circuit 24 and the output of the EOR circuit 31 is inverted. Therefore, as shown in FIG. 3d, since the DT flip-flop 32 is set by a trailing edge of the inverted output, the transistor $Tr_2$ is turned on, the base current of the transistor $Tr_1$ is input to the transistor $Tr_2$ and the driving of the light projecting device 1 is stopped. Therefore, when the output of the adding circuit 11 reaches the predetermined threshold value $V_{ref2}$, the light projection is stopped.

In the embodiment, since the denominator (the output of the adding circuit 11) as a divisor to divide the output of the subtracting circuit 10 is always set to the predetermined value $V_{ref2}$, the dividing circuit becomes unnecessary. The output of the subtracting circuit 10 at time $t_2$ directly indicates the position signal of the object. In other words, the output of the subtracting circuit 10 is given to the S/H circuit 20 and held at time $t_2$ corresponding to the leading edge of the output of the comparing circuit 24 and given to the comparing circuit 13. When the level of the signal held exceeds the predetermined threshold level $V_{ref1}$ set in the comparing circuit 13, it is possible to discriminate the object is located within a predetermined range. The output of the comparing circuit 13 is given to the signal processing circuit 14 and a check is made to see if the output of the comparing circuit 13 is obtained or not by the gate circuit 14a of the signal processing circuit 14. When the comparison signal is derived, the input signal is given to the integrating circuit 14b and its output level rises. Therefore, only when the output of the comparing circuit 13 is transmitted to the integrating circuit 14b through the gate circuit 14a for a few continuous periods, the output signal level reaches the threshold level $V_{ref3}$ of the comparing circuit 14c, so that the object detection signal can be output.

When the light emission of the light projecting device 1 stops, the output of the adding circuit 11 decreases, so that the output of the comparing circuit 24 is also stopped. In FIG. 3g, the time width between time $t_2$ and time $t_3$ is slightly exaggerated to show the time difference. After that, the DT flip-flop 32 is reset by the trailing edge of the output of the comparing circuit 22.

When the detection amount of the light reflected from the object 4 is large, the light projection is stopped in a short time after the start of the light projection. When the diffused reflected light amount obtained from the object is small because of a long distance of the object or its surface state, the light projection is stopped in a relatively long time after the start of the light projection. On the other hand, if the light amount is extremely small and the sum of the current outputs which are obtained from both ends of the PSD 6 does not reach the threshold level $V_{ref2}$ of the comparing circuit 24, the light projection is not stopped and no sampled signal is also given, so that the object detection signal is not output.

In the embodiment, the trapezoidal signal is output from the pulse oscillator 21 and the light projecting device is driven until the output from the adding circuit reaches the predetermined threshold level for a period of time until the output signal from the oscillator reaches the peak value. However, a pulse oscillator to generate a triangular wave pulse signal can be also used.

The output of the oscillator can be also set to the square wave output. In such a case, by directly giving the output of the square wave oscillator to the signal processing circuit 14 and EOR circuit 31, the light projection can be stopped when a predetermined light detection level is obtained. In this case, as shown in FIGS. 4a and 4b, when the light projection is performed, since the output which is obtained from the adding circuit 11 also rises almost simultaneously with the driving of the light projecting device, the light projection cannot be accurately stopped by the predetermined reflected light level. However, the reflected light amount becomes almost constant and a large change as in the conventional apparatus can be eliminated. Therefore, in this case, in place of the sample and hold circuit, it is necessary to output the position signal indicative of the position of the object by using the dividing circuit to divide the output of the subtracting circuit 10 by the output of the adding circuit 11 in a manner similar to the foregoing conventional apparatus. However, since the reflected light amount level which is used as a denominator of the dividing circuit does not so largely change but becomes almost constant, a variation in detection of the position can be reduced.

Second Embodiment

Figure 5:
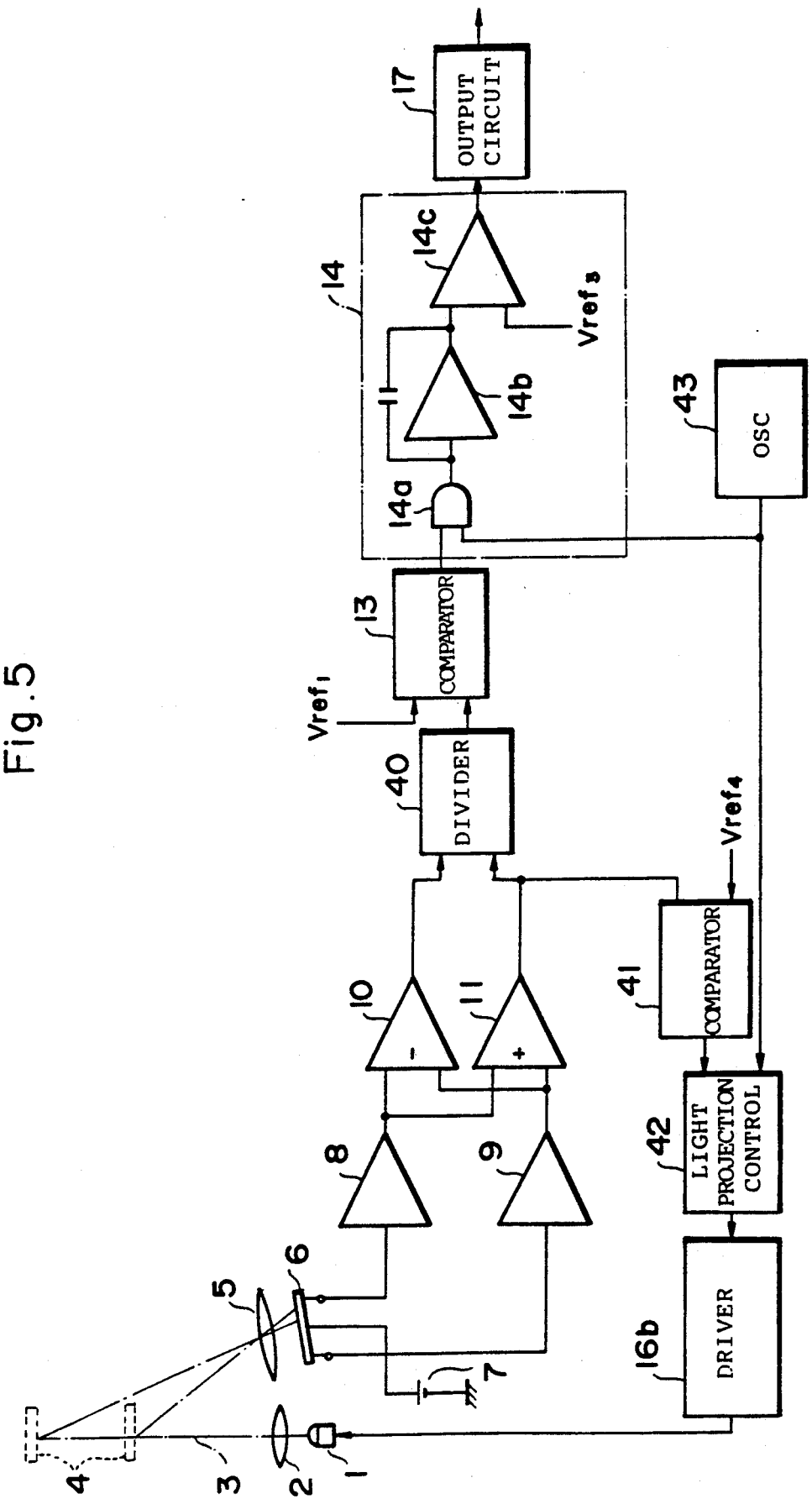
FIG. 5 is a block diagram showing a construction of a distance measuring apparatus according to the second embodiment of the invention.

FIG. 5 is a block diagram showing a construction of a distance measuring apparatus according to the second embodiment of the invention. In the diagram, the same parts and components as those in the foregoing first embodiment are designated by the same reference numerals and their descriptions are omitted. In the embodiment, the outputs of the subtracting circuit 10 and adding circuit 11 are given to a dividing circuit 40 and the subtracted output is divided by the added output. An output of the dividing circuit 40 is given to the comparing circuit 13. The output of the adding circuit 11 is given to a comparing circuit 41 as comparing means. A predetermined threshold value $V_{ref4}$ is set in the comparing circuit 41. When the input signal level exceeds the predetermined threshold value $V_{ref4}$, the comparing circuit 41 gives a comparison output to a light projection control circuit 42. On the other hand, the distance measuring apparatus in the second embodiment has an oscillator 43 to generate a square wave signal at every predetermined period. The square wave output signal is given to the signal processing circuit 14 and light projection control circuit 42. The light projection control circuit 42 constructs light projection control means for giving a signal whose level gradually increases to a light projecting device drive circuit 16b until the time point when the signal is given from the comparing circuit 41 at every oscillating period of the oscillator 43 and for stopping the generation of such a signal when the comparison output is given. The constructions of the signal processing circuit 14 and output circuit 17 are similar to those in the first embodiment mentioned above. The subtracting circuit 10, adding circuit 11, and dividing circuit 40 construct position signal detecting means for outputting the position signal indicative of the position of an object by an output distribution of the PSD 6.

The light projection control circuit 42, oscillator 43, and peripheral circuits thereof will be described further in detail with reference to FIG. 6. In the diagram, the oscillator 43 comprises an operational amplifier 51 and a transistor $Tr_3$ and is the square wave generator to generate the square wave signal. The output of the oscillator 43 is given to bases of transistors $Tr_4$ and $Tr_5$ of the light projection control circuit 42. The comparison output of the comparing circuit 41 is given to an OR circuit 52 and is also given through an inverter 53 to an inverting set input terminal of an RS flip-flop 54, respectively. A Q output of the flip-flop 54 is given to the OR circuit 52. The RS flip-flop 54 is reset by a trailing edge of the square wave signal. The transistor $Tr_4$ is provided to control a transistor $Tr_6$ connected to the power source side. The transistor $Tr_6$ is connected in parallel with a capacitor $C_1$ and its collector terminal is connected to the ground through a constant current source 55. A terminal voltage of the capacitor $C_1$ is connected to an input terminal of a voltage follower 56. An output of the voltage follower 56 is connected to a capacitor $C_2$ through a transistor $Tr_7$. The voltage follower 56 is provided to obtain a transmission pulse signal of a waveform in which the level increases and a change rate of the level also increases at every oscillating period of the oscillator 43 by gradually charging the capacitor $C_2$. A terminal output of the capacitor $C_2$ is given to the drive circuit 16b. The drive circuit 16b has a voltage follower 57 and transistors $Tr_8$ and $Tr_9$. The voltage follower 57 drives the light projecting device 1 such as a light emitting diode by the light projection pulse signal through the transistor $Tr_8$. The transistor $Tr_9$ is connected between an output terminal of the voltage follower 57 and the ground. An output signal of the OR circuit 52 is given to a base of the transistor $Tr_9$. The OR circuit 52 stops the light projection pulse when the comparison output is given.

The operation of the embodiment will now be described with reference to waveform diagrams. FIG. 7a shows an oscillation output of the oscillator 43 (collector output of the transistor $Tr_3$). In response to the oscillation output, for instance, the transistor $Tr_4$ is turned off at time intervals from time $t_4$ to time $t_6$, $t_7$ to $t_9$, and the like is turned on at time intervals from time $t_6$ to time $t_7$, $t_9$ to $t_{10}$, and the like, respectively. When the transistor $Tr_4$ is turned off, the transistor $Tr_6$ is also turned off, so that the capacitor $C_1$ is charged by the constant current source 55. Therefore, the terminal voltage of the capacitor $C_1$ (terminal voltage on the side of the current source 55) decreases after times $t_4$, $t_7$, and $T_{10}$ as shown in FIG. 7b, respectively. For a period of time when the transistor $Tr_4$ is in the OFF state, that is, for the time intervals from time $t_4$ to time $t_6$, $t_7$ to $t_9$, and the like, the terminal voltage of the capacitor $C_1$ decreases. If the charging time constant of the capacitor $C_1$ is set to an enough large value, the triangular wave signal having an almost linear shape can be obtained as shown in the diagram. The triangular wave signal is given to the capacitor $C_2$ through the voltage follower 56 and transistor $Tr_7$, so that the capacitor $C_2$ is charged. Therefore, the terminal voltage of the capacitor $C_2$ results in a signal whose rising rate gradually increases from times $t_4$, $t_7$, $t_{10}$, and the like as shown in FIG. 7c. Therefore, a light projection pulse signal as shown in FIG. 7d is obtained from the light projecting device drive circuit 16b and the light projecting device 1 is driven.

When the object 4 exists in the detecting region on the optical path of the light beam 3, the diffused reflected lights are obtained from the object 4. The current signals which are output from the position sensitive device 6 are converted into the voltage signals by the I/V converters 8 and 9 and they are given to the adding circuit 11. A light detection signal as shown in FIG. 7e is derived from the adding circuit 11. The light detection signal is compared with a predetermined threshold value $V_{ref4}$ which has been set in the comparing circuit 41. When the signal level exceeds the threshold level $V_{ref4}$, the transistor $Tr_9$ is turned on through the OR circuit 52 and the light projection pulse signal level is set to zero at times $t_5$ and $t_8$ as shown in FIG. 7d. At the same time, the RS flip-flop 54 of the light projection control circuit 42 is inverted and a Q output is derived. Since the RS flip-flop 54 is reset at times $t_6$, $t_9$, and the like corresponding to the leading edge of the output of the oscillator 43, the Q output of the RS flip-flop 54 is held at the H level for the time intervals from $t_5$ to $t_6$ and from $t_8$ to $t_9$. Therefore, since the addition output is stopped at an almost constant value, the position signal indicative of the position of an object can be obtained by dividing the output of the subtracting circuit 10 at that time by the output of the adding circuit 11 by the dividing circuit 40, that is, on the basis of the output distribution of the PSD 6.

In the embodiment, the light projection pulse signal whose level increases and whose increasing rate gradually increases from the start point of the light projection is used. Thus, in enlarged diagrams of the light projection pulse and its light detection signal shown in FIGS. 8a and 8b, when it is assumed that the light projection pulses are generated for the time interval from $t_{11}$ to $t_{13}$, in the case where an object having an extremely high reflectivity is located near the distance measuring apparatus, the output level of the adding circuit 11 reaches the threshold value $V_{ref4}$ in a short time from the start point of the light projection and the light projection is stopped. In general, a certain time delay is certainly caused in the circuit for the time interval after the output level of the adding circuit 11 reached the threshold value $V_{ref4}$ until the light projection is actually stopped. However, if the reflected light amount is remarkably large and the signal level reaches the threshold value $V_{ref4}$ for the time interval from $t_{11}$ to $t_{12}$ corresponding to the former half of the light projection pulse, the change rate of the level is not so large. Therefore, the error amount due to a delay time $\Delta_t$ of the stop of the light projection pulse is small. However, in the case of using a triangular wave light projection pulse as shown in FIG. 8c, even if the light projection pulse is stopped with the same delay time $\Delta_t$ after the light detection signal level reached the threshold value $V_{ref4}$, since the change rate of the level is large, the light detection signal level fairly exceeds the threshold value $V_{ref4}$ for the period of time until the light projection is actually stopped as shown in FIG. 8d and one of the two input signals of the dividing circuit increases.

Returning to FIGS. 5 to 7h, the output of the dividing circuit 40 is given to the comparing circuit 13. When the output signal level exceeds the threshold value $V_{ref1}$ of the comparing circuit 13, it is possible to discriminate an object is located within a predetermined range. The output of the comparing circuit 13 is given to the signal processing circuit 14. The operations of the signal processing circuit 14 and output circuit 17 are similar to those described in the first embodiment.

The transistors $Tr_4$ and $Tr_5$ are turned on at times $t_6$ and $t_9$ when each of the transmitting periods ends. The capacitor $C_1$ can be discharged.

In the embodiment, the parabolic transmission pulse signal is obtained by charging the capacitor $C_2$ by the triangular wave signal. However, the similar effect can be also obtained by using various kinds of light projection pulse signals in each of which the increasing rate gradually rises.

Third Embodiment

Figure 9:
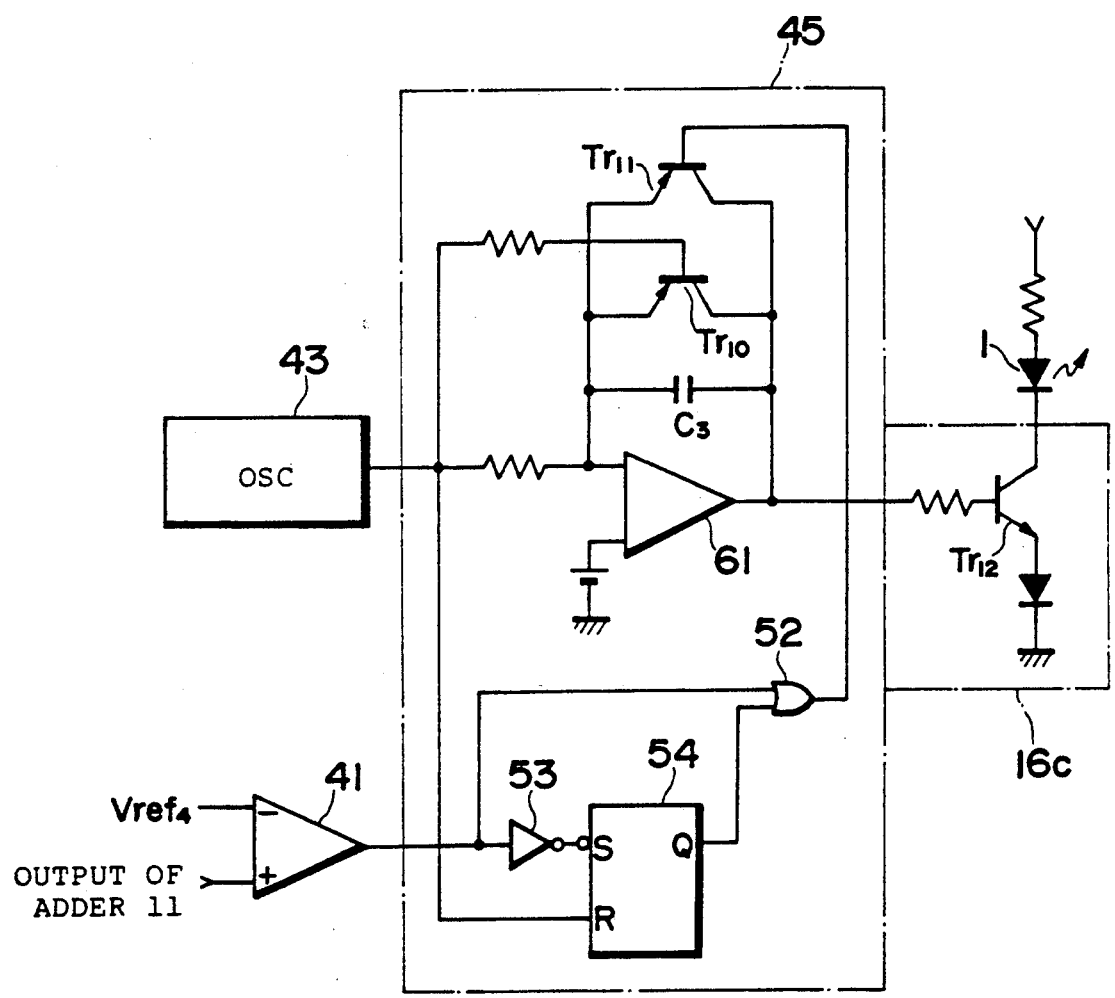
FIG. 9 is a circuit diagram showing a detailed construction of a light projection control circuit and its peripheral circuits in the third embodiment of the invention.

FIG. 9 is a circuit diagram showing the third embodiment of a light projection control circuit and a light projecting device drive circuit. In the diagram, the same parts and components as those shown in the first and second embodiments are designated by the same reference numerals. In the third embodiment, similarly to the second embodiment, the output of the adding circuit 11 is given to a light projection control circuit 45 through the comparing circuit 41. The light projection control circuit 45 has an operational amplifier 61 to integrate a terminal voltage across a capacitor $C_3$. The output of the oscillator 43 is given to an input terminal of the operational amplifier 61. The capacitor $C_3$ and PNP type transistors $Tr_{10}$ and $Tr_{11}$ are connected between input and output terminals of the operational amplifier 61. The output of the oscillator 43 is connected to a base of the transistor $Tr_{10}$. The integrating operation is started or stopped by the oscillation output. In a manner similar to the foregoing embodiment, the output of the comparing circuit 41 is given to the OR circuit 52 and to the RS flip-flop 54 through inverter 53. The Q output of the flip-flop 54 is connected to a base of a transistor $Tr_{11}$ through the OR circuit 52. The output of the light projection control circuit 45 is given to a base of a transistor $Tr_{12}$ of the light projecting device drive circuit 16c. Since the base-emitter characteristic of the transistor $Tr_{12}$ is exponential as shown by the diode characteristic, by changing the voltage between the base and emitter like a triangular wave, an exponential light projection pulse current signal is obtained from the transistor $Tr_{12}$. The light emitting diode 1 as the light projecting device is driven by the exponential light projection pulse signal. In the embodiment, the light projection control circuit 45 and light projecting device drive circuit 16c construct the light projection control means for generating a light projection pulse in which an increasing rate of the level gradually increases from the start point of the light projection at every predetermined period.

FIGS. 10a to 10h are waveform diagrams showing the operation of the embodiment. In the diagrams, the output of the oscillator 43 is given to the operational amplifier 61 of the light projection control circuit 45. A triangular wave signal as shown in FIG. 10b is output from the amplifier 61. Since the triangular wave signal is input to the transistor $Tr_{12}$ of the drive circuit 16c, exponential light projection pulse signals as shown in FIGS. 10c and 10d can be obtained. When an object exists near the distance measuring apparatus and the reflected light amount from the object is large and the addition output signal level reaches the threshold value $V_{ref4}$, the transistor $Tr_{11}$ is turned on through the OR circuit 52 and the charging of the capacitor $C_3$ is stopped, so that the transmission pulse can be soon stopped.

In the embodiment, the exponential signal is used as the light projection pulse signal. However, various kinds of light projection control signals in each of which the increasing rate of the level gradually increases can be also obviously used.

Fourth Embodiment

Figure 11:
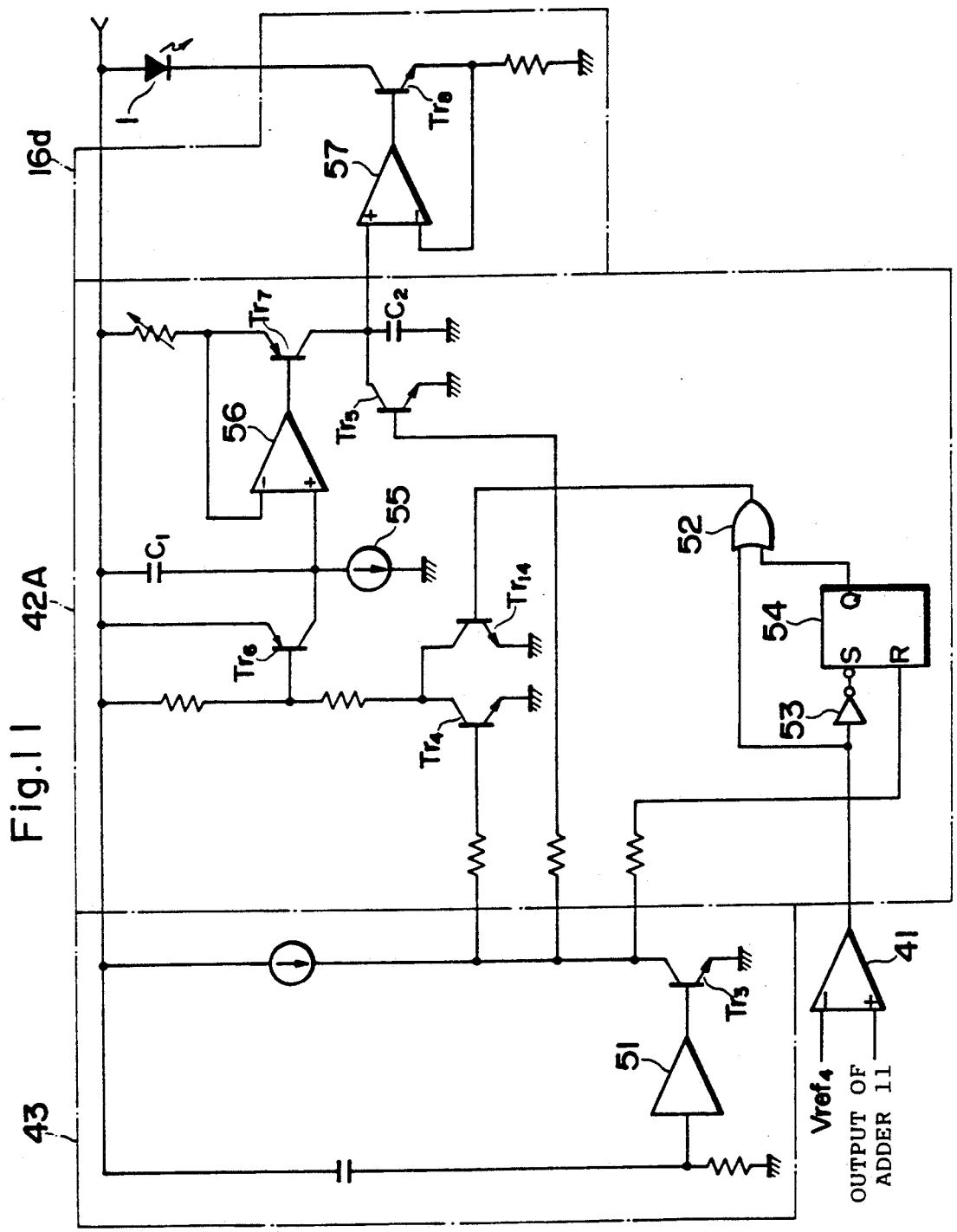
FIG. 11 is a circuit diagram showing a detailed construction of a light projection control circuit and its peripheral circuits in the fourth embodiment.

FIGS. 11 and 12a to 12h show the fourth embodiment of the invention. Although the whole circuit construction of a distance measuring apparatus of the fourth embodiment is fundamentally the same as that shown in FIG. 5, it differs with respect to the following points. That is, in place of the light projection control circuit 42 and light projecting device drive circuit 16b shown in FIG. 5, a light projection control circuit 42A and a light projecting device drive circuit 16d are provided in the fourth embodiment and a practical example of the circuits 42A and 16d is shown in FIG. 11. In FIG. 11, the same parts and components as those described above are designated by the same reference numerals and their descriptions are omitted here. Since FIGS. 12a to 12h correspond to FIGS. 7a to 7h, the same reference numerals are used in these diagrams as possible.

The light projection control circuit 42A constructs the light projection control means for outputting a signal whose level gradually increases until the signal is given from the comparing circuit 41 at every oscillating period of the oscillator 43 and for giving the signal to the drive circuit 16d and for maintaining the output level until a predetermined time (until the end of the oscillating period) when the comparison output is given. The drive circuit 16d intermittently drives the light projecting device 1.

When comparing FIGS. 6 and 11, the transistor $Tr_9$ which is controlled by the OR circuit 52 is eliminated from the drive circuit 16b. In place of the $Tr_9$, a transistor $Tr_{14}$ is provided in the control circuit 42A. The transistor $Tr_{14}$ is connected in parallel with the transistor $Tr_4$ and controlled by the output of the OR circuit 52. The transistor $Tr_6$ is controlled by the transistors $Tr_4$ and $Tr_{14}$.

Figure 12:
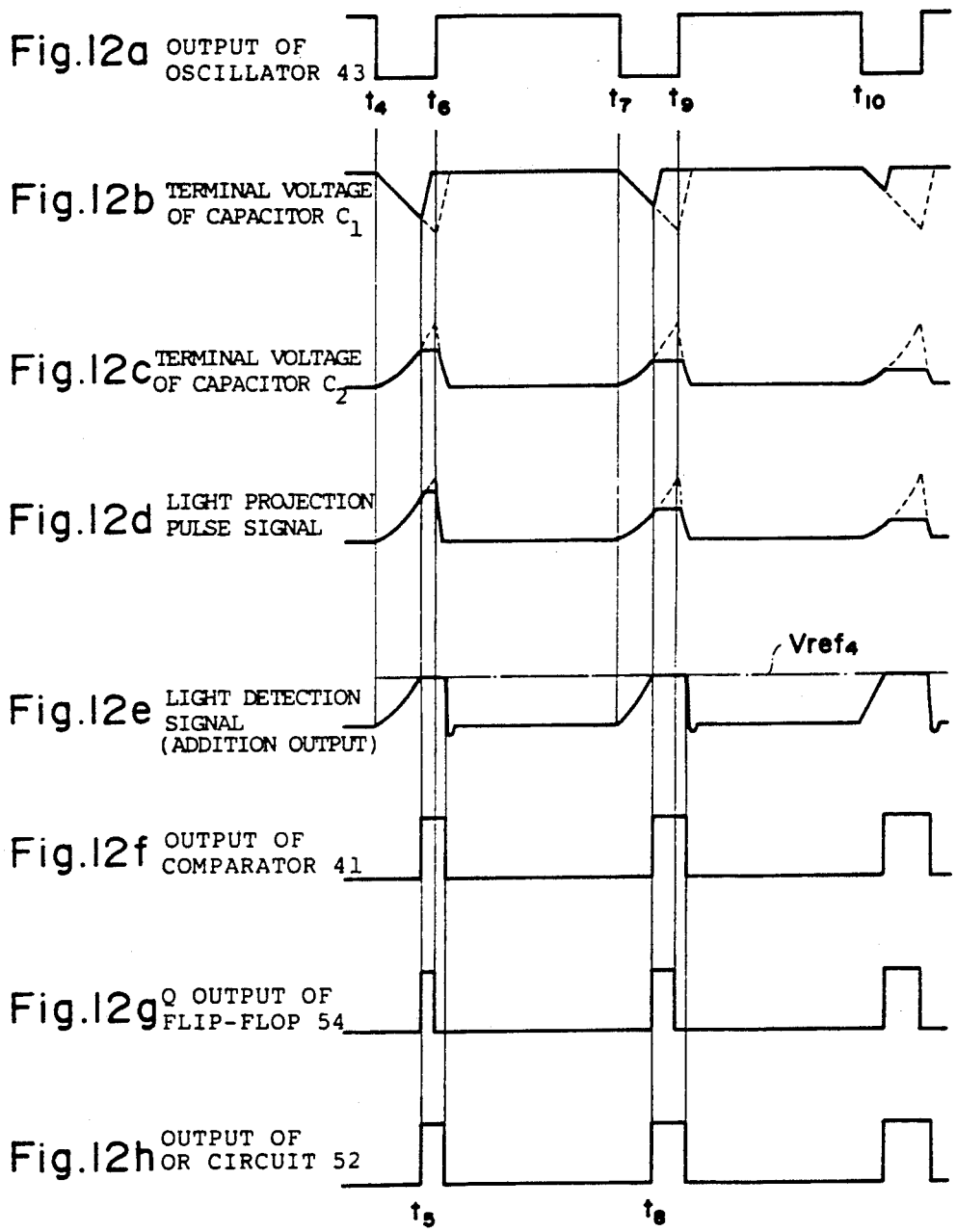
FIGS. 12a to 12h are waveform diagrams showing a waveform in each section in the fourth embodiment.

The operation of the embodiment will now be described. For instance, by the oscillation output of the oscillator 43, the transistor $Tr_4$ is turned off for the time intervals from $t_4$ to $t_6$, from $t_7$ to $t_9$, and the like and is turned on for the time intervals from $t_6$ to $t_7$, from $t_9$ to $t_{10}$, and the like, respectively. When the transistor $Tr_4$ is turned off, the transistor $Tr_6$ is also turned off, so that the capacitor $C_1$ is charged by the constant current source 55. Therefore, the terminal voltage across the capacitor $C_1$ decreases after times $t_4$, $t_7$, and $t_{10}$ as shown in FIG. 12b. The terminal voltage is given to the capacitor $C_2$ through the voltage follower 56 and transistor $Tr_7$ and the capacitor $C_2$ is charged. As shown by broken lines in FIG. 12c, the terminal voltage of the capacitor $C_2$ results in a signal whose increasing rate gradually increases from times $t_4$, $t_7$, and $t_{10}$, respectively. Thus, a light projection pulse signal as shown by broken lines in FIG. 12d is obtained from the drive circuit 16d and the light projecting device 1 is driven. When the object 4 exists in the detecting region, the diffused reflected lights are obtained from the object 4. Due to this, the output currents obtained at both ends of the PSD 6 are converted into the voltage signals by the I/V converters 8 and 9. The voltage signals are added by the adding circuit 11, so that a light detection signal as shown in FIG. 12e is obtained from the adding circuit 11. The light detection signal is compared with the threshold value $V_{ref4}$ set in the comparing circuit 41. When the signal level exceeds the threshold value $V_{ref4}$, the RS flip-flop 54 of the light projection control circuit 42A is inverted. Thus, the Q output is obtained from the flip-flop 54 at the time point when the added light detection signal exceeds the threshold level $V_{ref4}$ as shown in FIGS. 12f and 12g. Since the RS flip-flop 54 is reset at times $t_6$, $t_9$, and the like corresponding to the leading edge of the output of the oscillator 43, the Q output is held at the H level for the time intervals from $t_5$ to $t_6$, from $t_8$ to $t_9$, and the like. Since the transistor $Tr_{14}$ is turned on through the OR circuit 52 at times $t_5$ and $t_8$ when the flip-flop 54 is set and the transistor $Tr_6$ is turned on, the charging of the capacitor $C_1$ is stopped. Thus, the terminal voltage of the capacitor $C_1$ is set to a waveform as shown by solid lines in FIG. 12b. In correspondence to this, the terminal voltage of the capacitor $C_2$ is also set to a waveform as shown by solid lines in FIG. 12c. Consequently, as shown by solid lines in FIG. 12d, the actual light projection pulse signal is held at a constant level for the period of time after the comparing circuit 41 generated the output until its transmitting period ends (until the output of the oscillator 43 rises), that is, for the time intervals from $t_5$ to $t_6$, from $t_8$ to $t_9$, and the like. Therefore, since the input level of the PSD 6 is also held constant in the embodiment, the addition output and subtraction output which do not change for the time intervals from $t_5$ to $t_6$, from $t_8$ to $t_9$, and the like are given to the dividing circuit 40, respectively. Since the input signals of the dividing circuit 40 do not fluctuate, there is no need to use a dividing circuit having a high response speed. Since the addition output is almost constant, the position signal indicative of the position of an object can be accurately obtained from the dividing circuit 40 by using an ordinary dividing circuit without requiring a wide dynamic range. Since the transistor $Tr_5$ is turned on at times $t_6$, $t_9$, and the like when each period is finished, the capacitor $C_2$ can be discharged.

In the embodiment, the RS flip-flop 54 is set by the output of the comparing circuit 41 and the charging of the capacitor $C_1$ is stopped and the level of the light projection pulse is held. If the transistor $Tr_{14}$ was directly controlled by the output of the comparing circuit 41, there occurs an inconvenience such that the light sensitive level is soon reduced to $V_{ref4}$ or lower after the stop of the charging operation, the comparison output trails, and the light projection is restarted. However, according to the construction of the embodiment, such an inconvenience is solved.

In the embodiment, a triangular wave is formed by charging the first capacitor at every light projecting period and the second capacitor is charged on the basis of the triangular wave, thereby obtaining a parabolic light projection pulse whose voltage level increases in proportion to the square of the time. However, the triangular wave can be also directly used or the exponential waveform can be also used as the light projection pulse signal.

Further in the embodiment, the ratio of the addition output and subtraction output is calculated by the dividing circuit 40 and used as a position signal. However, it is also possible to directly give the two I/V conversion outputs which are obtained from both ends of the PSD 6 to the dividing circuit 40 and to obtain the position signal by the ratio of those output signals. On the other hand, by performing the division between the output of the adding circuit and the output of either one of the I/V converters 8 and 9, for instance, the output of the I/V converter 9, the position signal can be also obtained.

Fifth Embodiment

Figure 13:
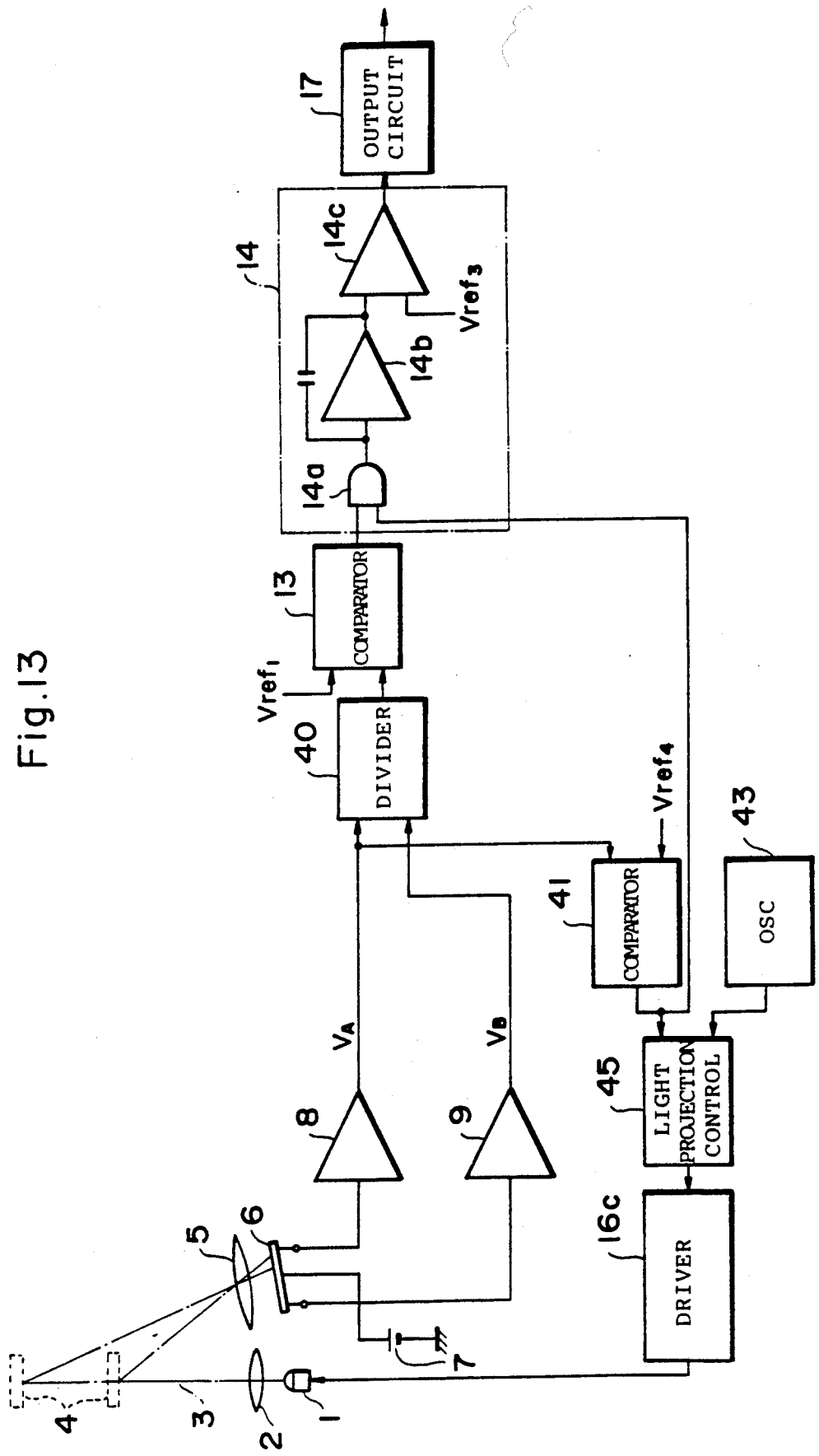
FIG. 13 is a block diagram showing a construction of a distance measuring apparatus according to the fifth embodiment of the invention.

FIG. 13 shows the fifth embodiment. In the diagram, the same parts and components as those shown in FIG. 5 are designated by the same reference numerals and their descriptions are omitted. When comparing the embodiment shown in FIG. 13 with the circuit of FIG. 5, the subtracting circuit 10 and adding circuit 11 are not provided. The gate circuit 14a of the signal processing circuit 14 is controlled by the output signal of the comparing circuit 41. The current outputs of the PSD 6 are given to the I/V converters 8 and 9. The I/V converters 8 and 9 convert the current outputs obtained from both ends of the PSD 6 into the voltage signals $V_A$ and $V_B$. The output voltage signals $V_A$ and $V_B$ are given to the dividing circuit 40. The dividing circuit 40 divides the output signals $V_B$ by $V_A$ to calculate, for instance, the ratio $V_B/V_A$, thereby obtaining a distance signal corresponding to the distance to an object. An output of the dividing circuit 40 is given to the comparing circuit 13.

The distance measuring apparatus of the embodiment has the oscillator 43 to intermittently generate a square wave signal. An output of the oscillator 43 is given to the light projection control circuit 45. The output of either one of the I/V converters, preferably, the output $V_A$ of the I/V converter 8 arranged at a position which is away from the light projecting device 1 is given to the comparing circuit 41. The predetermined threshold level $V_{ref1}$ is set in the comparing circuit 41. When the output signal level of the I/V converter 8 is the threshold level $V_{ref1}$ or lower, the comparing circuit 41 gives a control signal to the light projection control circuit 45.

Figure 14:
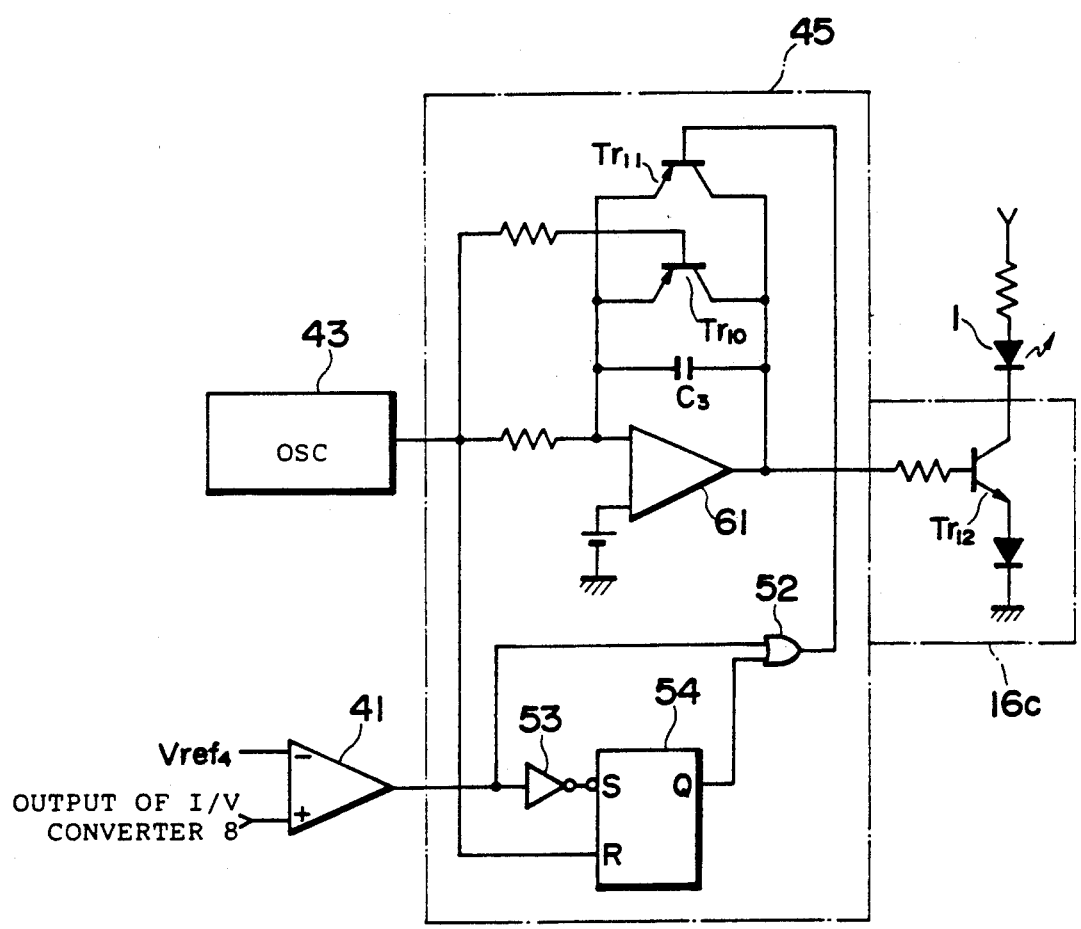
FIG. 14 is a circuit diagram showing a detailed construction of a light projection control circuit and its peripheral circuits in the fifth embodiment.

A construction of the light projection control circuit 45 is shown in FIG. 14. The control circuit 45 is constructed substantially in the same manner as the circuit shown in FIG. 9 except a different point that the threshold level $V_{ref1}$ and the output of the I/V converter 8 are input to the comparing circuit 41 to control the flip-flop 54 and OR circuit 52.

The operation of the embodiment will now be described with reference to time charts. FIG. 15a shows an oscillation signal of the oscillator 43. The oscillation signal is given to the operational amplifier 61 of the light projection control circuit 45 and a triangular wave signal as shown in FIG. 15b is output. Since the triangular wave signal is given to the transistor $Tr_{12}$ of the light projecting device drive circuit 16c, an exponential light projection pulse signal can be intermittently obtained as shown in FIG. 15c, which illustrates a collector voltage of the transistor $Tr_{12}$. When the reflected light amount from the object is large, at times $t_{21}$ and $t_{22}$ when the output of the I/V converter 8 reaches the threshold level $V_{ref1}$ (the inverted output is shown in FIG. 15d), the transistor $Tr_{11}$ is turned on through the OR circuit 52, thereby stopping the charging of the capacitor $C_1$. Therefore, the light projection pulse can be soon stopped. Thus, the output of the operational amplifier 61 and the collector voltage of the transistor $Tr_{12}$ change as shown by solid lines in FIGS. 15b and 15c. When the light projection is stopped at a predetermined level, since the level of one of the two input signals of the dividing circuit 40 becomes almost constant, the distance to the object can be detected on the basis of the ratio of the outputs of the I/V converters 8 and 9 at that time. The output of the dividing circuit 40 is given to the comparing circuit 13 and is checked to see if it exceeds the threshold value $V_{ref1}$ or not. The output of the comparing circuit 13 is input to the signal processing circuit 14 and the foregoing process is executed.

In the embodiment, the light projection is stopped when the output of the I/V converter 8 as the light current output on the side remote from the light projecting device 1 reaches the predetermined level. This is because when the object 4 exists at a further close position, its reflected light amount level is large, but it is effective to prevent the saturation of the dividing circuit 40 by stopping the light projection on the basis of the output $V_A$ of the I/V converter 8 whose output level increases at that time. However, the light projection can be also stopped on the basis of the output of the I/V converter 9. The dividing circuit 40 can obviously output a position signal on the basis of not only the ratio $V_B/V_A$ but also the ratio $V_A/V_B$.

Sixth Embodiment

Figure 16:
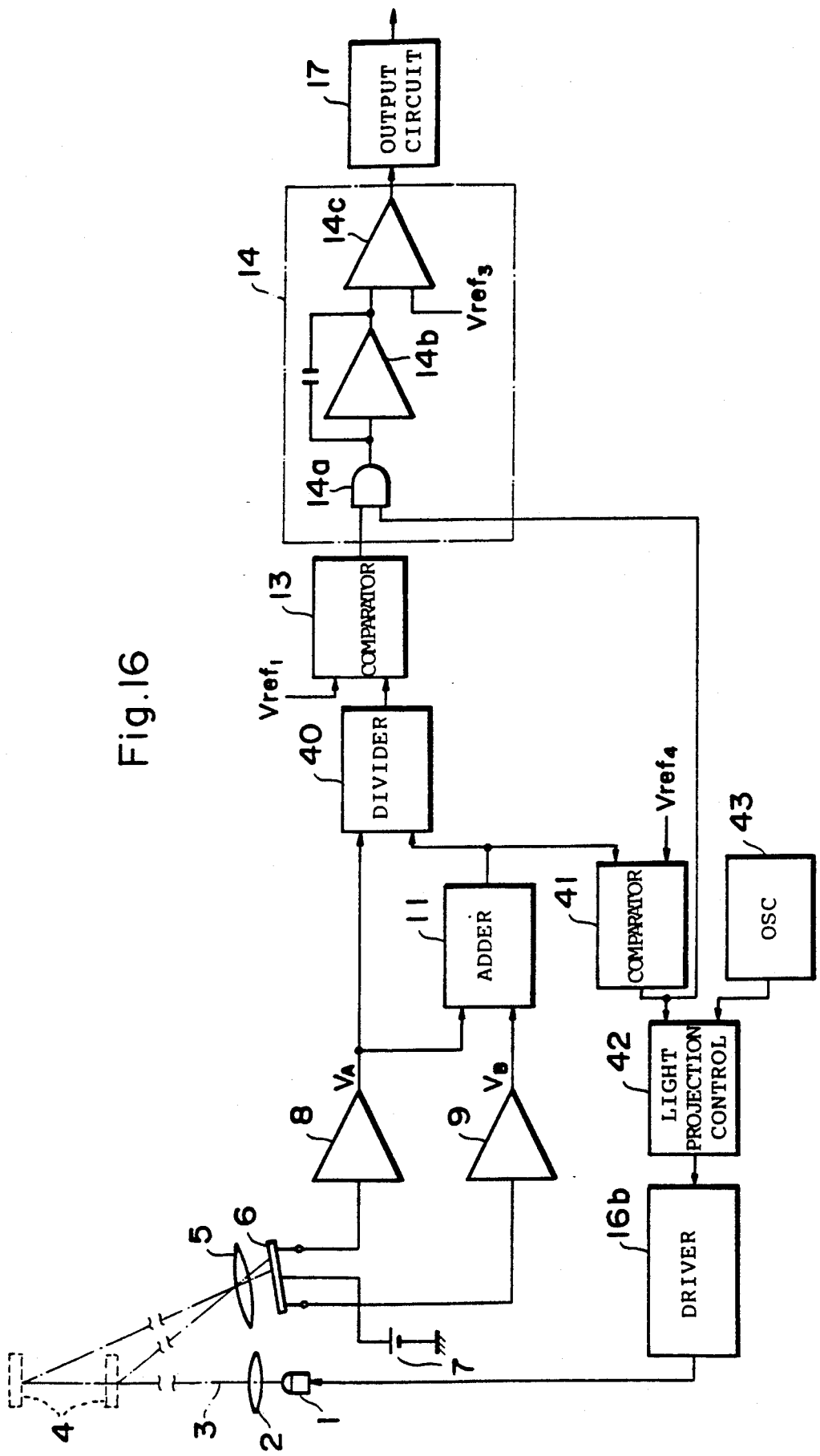
FIG. 16 is a block diagram showing a whole constitution of a distance measuring apparatus according to the sixth embodiment of the invention.

FIG. 16 is a block diagram showing a construction of a distance measuring apparatus according to the sixth embodiment. In FIG. 16, the same parts and components as those shown in the fifth embodiment are designated by the same reference numerals and their descriptions are omitted. In the sixth embodiment, the outputs of the I/V converters 8 and 9 are given to the adding circuit 11. The adding circuit 11 adds the outputs $V_A$ and $V_B$ of the I/V converters 8 and 9 and gives its addition output to the dividing circuit 40. The output of the I/V converter 8 is given to the dividing circuit 40. Similarly to the fifth embodiment, a predetermined threshold value $V_{ref1}$ is set in the comparing circuit 41. When the input signal level is the threshold level $V_{ref1}$ or lower, the comparing circuit 41 gives a comparison output to the light projection control circuit 42. The distance measuring apparatus in the embodiment has the oscillator 43 to generate a square wave signal at a predetermined period. An output of the oscillator 43 is given to the light projection control circuit 42. The light projection control circuit 42 constructs the light projection control means for outputting a pulse signal whose level gradually increases until the signal-is-given from the comparing circuit 41 at every oscillating period of the oscillator 43 and for giving the pulse signal to the light projecting device drive circuit 16b and for stopping the generation of the pulse signal when the comparison output is given.

Constructions of the oscillator 43, light projection control circuit 42, and drive circuit 16b are the same as those shown in FIG. 6. The operation of the distance measuring apparatus in the sixth embodiment is the same as that shown in FIGS. 7a to 7h. When the comparison output is obtained from the comparing circuit 41, the result of the division, i.e., $V_A/(V_A+V_B)$, between the addition output $(V_A+V_B)$ of the adding circuit 11 and the output $V_A$ of the I/V converter 8 is given to the comparing circuit 13. The result of the comparison is input to the signal processing circuit 14 through the gate circuit 14a.

Although the division of the addition output of the I/V converters 8 and 9 and the output $V_A$ of the I/V converter 8 is executed by the dividing circuit 41 in the embodiment, the output $V_B$ of the other I/V converter 9 can be also divided by the addition output.

What is claimed is:

1. A distance measuring apparatus including light projecting means which has a light projecting device and projects a collimated light beam toward a detecting region and light detecting means having a position sensitive device which has an optical axis arranged so as to cross an optical axis of said light projecting means at a predetermined angle and receives diffused reflected light from an object and outputs at least two currents corresponding to light detecting positions, in which a distance to such object is detected on the basis of said light detecting positions of said position sensitive device, said apparatus comprising:

adding means for adding together said at least two currents from said position sensitive device;

comparing means for comparing an adding means output with a predetermined threshold value and for generating a comparison output when said addition output exceeds said predetermined threshold value;

light projection control means for generating, at a predetermined time period, a light projection pulse signal whose output lever gradually increases, and for stopping said light projection by said light projecting means when said comparison output is generated; and position signal detecting means for outputting a position signal for said object on the basis of said at least two output currents of said position sensitive device which are obtained when said light projection is stopped.

2. A distance measuring apparatus including light projecting means which has a light projecting device and projects a collimated light beam toward a detecting region and light detecting means having a position sensitive device which has an optical axis arranged so as to cross an optical axis of said light projecting means at a predetermined angle and receives diffused reflected light from an object and outputs at least two currents corresponding to light detecting positions, in which a distance to the object is detected on the basis of said light detecting positions of said position sensitive device, said apparatus comprising:

adding means for adding together said at least two currents from said position sensitive device;

comparing means for comparing an addition output of said adding means with a predetermined threshold value and for generating a comparison output when said addition output exceeds said predetermined threshold value;

light projection control means for generating, at a predetermined time period, a light projection pulse signal whose level increases and whose level-increasing rate gradually increases and for stopping the generation of the light projection pulse signal at a time when said comparison output is generated from the comparing means; and position signal detecting means for outputting a position signal of said object on the basis of said at least two output currents of the position sensitive device when said light projection control means stops said projection light pulse signal.

3. A distance measuring apparatus including light projecting means which has a light projecting device and projects a collimated light beam toward a detecting region and light detecting means having a position sensitive device which has an optical axis arranged so as to cross an optical axis of said light projecting means at a predetermined angle and receives diffused reflected light from an object and outputs at least two signals corresponding to light detecting positions, in which distance to the object is detected on the basis of the light detecting positions of said position sensitive device, said apparatus comprising:

adding means for adding together said at least two signals obtained from said position sensitive device;

comparing means for comparing an addition output of said adding means with a predetermined threshold value and for generating a comparison output when said addition output exceeds said predetermined threshold value;

light projection control means for generating, at a predetermined period, a light projection pulse signal whose output level gradually increases and for holding said light projection pulse signal at its level at a time when the comparison output is generated from the comparing means; and position signal detecting means for outputting a position signal of said object on the basis of a distribution of said at least two signals obtained from said position sensitive device.

4. A distance measuring apparatus including light projecting means which has a light projecting device and projects a light beam toward a detecting region and light detecting means having a position sensitive device which has an optical axis arranged so as to cross an optical axis of said light projecting means at a predetermined angle and receives diffused reflected light form an object and outputs at least two currents corresponding to light detecting positions, in which a distance to the object is detected on the basis of the light detecting positions of said position sensitive device, said apparatus comprising:

comparing means for comparing either one of said at least two currents from said position sensitive device with a predetermined threshold value and for generating a comparison output when said current output exceeds said predetermined threshold value;

light projection control means for generating, at a predetermined period, a light projection pulse in which a level of said light projection pulse increase and a level-increasing rate of said light projection pulse also gradually increases and for stopping said light projection pulse when the comparison output is generated from the comparing means; and a dividing circuit for calculating a ratio of said at least two currents from said position sensitive device when said light projection control means stops said light projection.

5. A distance measuring apparatus including light projecting means which has a light projecting device and projects a light beam toward a detecting region and light detecting means having a position sensitive device which has an optical axis arranged so as to cross an optical axis of said light projecting means at a predetermined angle and receives diffused reflected light from an object and outputs at least two currents corresponding to light detecting positions, in which a distance to the object is detected on the basis of the light detecting positions of said position sensitive device, said apparatus comprising:

adding means for adding together said at least two currents from said position sensitive device;

comparing means for comparing an addition output of the adding means with a predetermined threshold value and for generating a comparison output when said addition output exceeds said predetermined threshold value;

light projection control means for generating, at a predetermined period, a light projection pulse in which a pulse level of said light projection pulse increases and a rate of level-increase of said light projection pulses gradually increases and for stopping said light projection pulse signal at a time when the comparison output is generated from the comparing means; and a dividing circuit for outputting a position signal of said object based on a ratio of the addition output of the adding means and either one of the current outputs of the position sensitive device.

6. The distance measuring apparatus according to claim 1, wherein said light projection control means generates, after a predetermined period, a light projection signal whose pulse level increases and whose rate of level-increase gradually increases.

7. The distance measuring apparatus according to claim 1, further comprising a subtracting means for subtracting said at least two currents from said position sensitive device.

8. The distance measuring apparatus according to claim 7, wherein an output from said subtracting means is provided to said position signal detecting means and the position signal is output when a second threshold level is exceeded.

9. The distance measuring apparatus according to claim 1, wherein said position signal is provided quickly when the object is located a short distance from said light, is provided a relatively long time when said object is located at a long distance from said light and is not provided at all when said object is too far from said light source to provide sufficient reflected light.

10. A method for measuring distance including a light projecting device which projects a collimated light beam toward a detecting region and a light detecting means having a position sensitive device which has an optical axis arranged so as to cross an optical axis of said light projecting means at a predetermined angle and receives diffused reflected light from an object and outputs at least two currents corresponding to light detecting positions, in which a position of such object is detected on the basis of said light detecting positions of said position sensitive device, comprising the steps of:

adding said at least two currents from said position sensitive device;

comprising said added at least two currents with a predetermined threshold value;

generating a comparison output when said added at least two currents exceeds said predetermined threshold value;

providing, at a predetermined period, a light projection pulse signal whose output gradually increases;

stopping said light projection pulse signal when said comparison output is generated; and outputting a position signal for said object based upon said at least two output currents.

11. The method according to claim 10, wherein said providing step increases said light projection pulse level and gradually increases the level-increase rate of said light projection pulse.

12. The method according to claim 10, wherein said position signal is outputted based upon a distribution of said at least two output currents obtained from a dividing circuit.

13. A distance measuring apparatus including light projecting means which has a light projecting device and projects a light beam toward a detecting region and light detecting means having a position sensitive device which has an optical axis arranged so as to cross an optical axis of said light projecting means at a predetermined angle and receives diffused reflected light from an object and outputs at least two currents corresponding to light detecting positions, in which a distance to the object is detected on the basis of the light detecting positions of said position sensitive device, said apparatus comprising:

comparing means for comparing either one of said at least two current outputs obtained from said position sensitive device with a predetermined threshold value and for generating a comparison output when said current output exceeds said predetermined threshold value;

light projection control means for generating, at a predetermined period, a light projection pulse in which a level of said light projection pulse increases and for holding said light projection pulse at its level at a time when said comparison output is generated from said comparing means; and a dividing circuit for calculating a ratio of said at least two currents from said position sensitive device while said light projection pulse is being held.

14. The distance measuring apparatus according to claim 13, wherein said light projection control means generates said light projection pulse in which the level of said light projection pulse increases and a level-increasing rate of said light projection pulse also gradually increases.

* * * * *